March 19, 1957 B. WERFEL 2,785,908
FLEXIBLE PINCHED FRAME BODY
Filed June 3, 1954 2 Sheets-Sheet 1
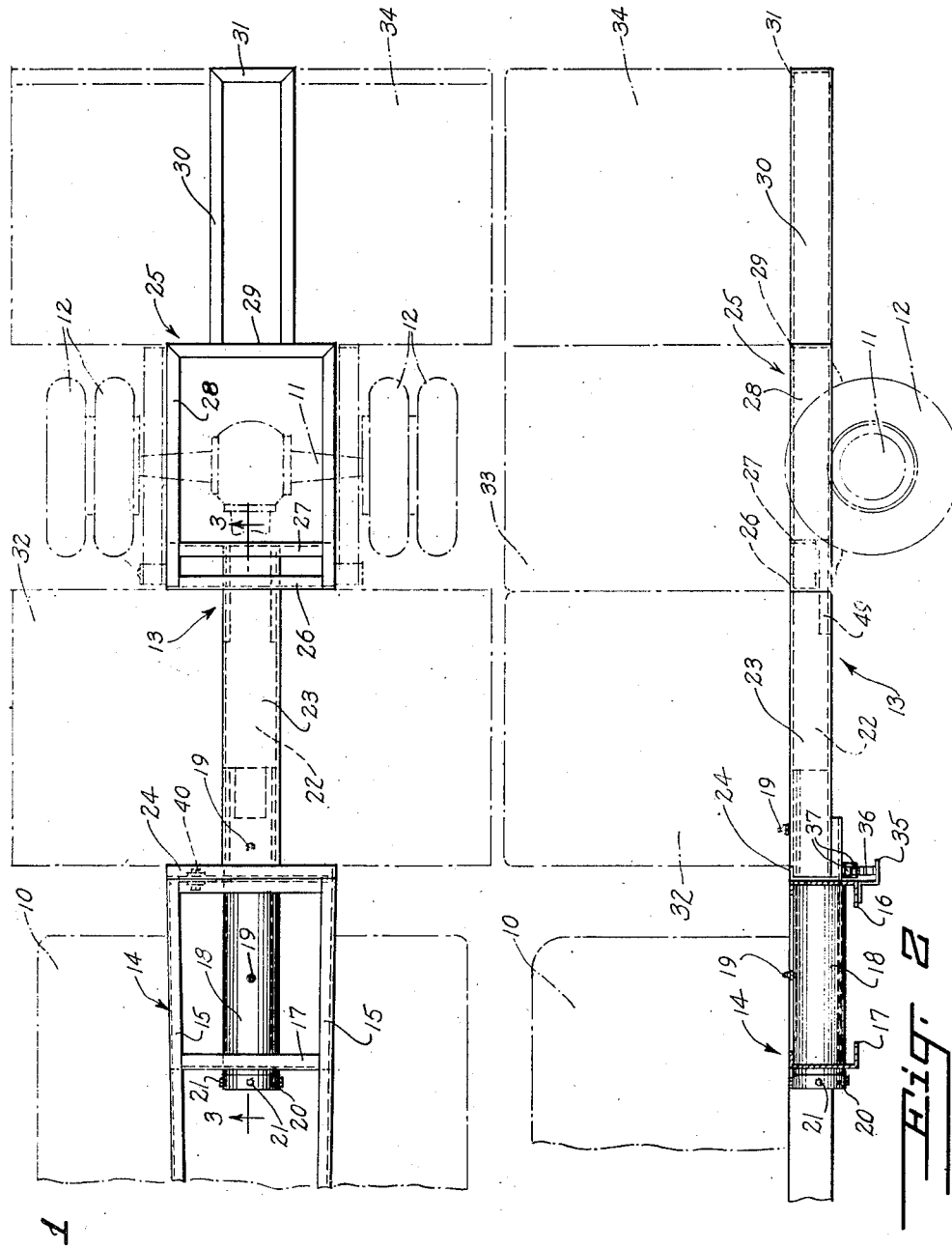
INVENTOR.
Bernard Werfel
BY
Sherman Levy
Attorney

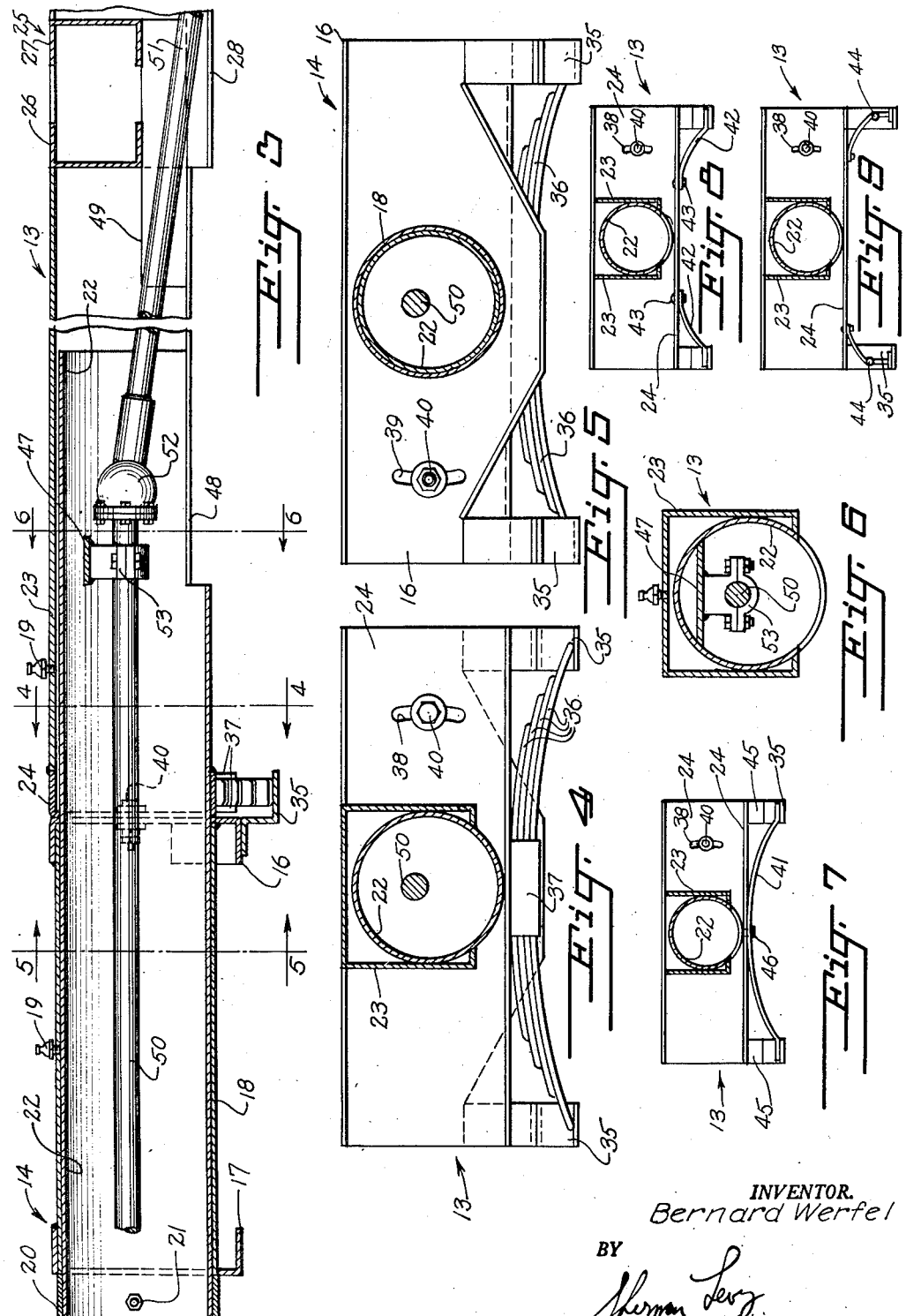

United States Patent Office 2,785,908
Patented Mar. 19, 1957

2,785,908
FLEXIBLE PINCHED FRAME BODY

Bernard Werfel, Fresno, Calif., assignor of one-half to Fred Gerhardt, Fresno, Calif.

Application June 3, 1954, Serial No. 434,126

6 Claims. (Cl. 280—106)

This invention relates to a vehicle frame, and more particularly to a vehicle frame which includes sections that are pivotally or rotatably connected together.

This invention is an improvement over the Truck and Trailer Body shown and described in Patent No. 2,596,478, patented May 13, 1952.

The object of the invention is to provide a vehicle frame which is torqueless since the frame is constructed so that it includes a forward portion that can rotate independently of a rear portion whereby twisting and cracking of the frame will be prevented.

Another object of the invention is to provide a flexible pinched frame for a vehicle such as a truck wherein body twisting and cracking will be eliminated and whereby overloading of the tires and springs will be prevented since the weight on the vehicle will be distributed evenly in all body positions, to thus increase the life of the tires and increase the mileage of the vehicle.

A still further object of the invention is to provide a pinched flexible truck frame that will have increased drive line and increased drive line bearing life as well as increased vehicle roadability and a better load drive as well as decreased driver fatigue.

A still further object of the invention is to provide a flexible pinched truck frame which will decrease driver fatigue, eliminate twist of the cab and fenders, increase spring life, increase the life of the rear axle and increase the strength of the chassis as well as increase the life of the vehicle, and whereby repair and maintenance costs will be reduced.

A further object of the invention is to provide a wheeled underframe wherein a portion of the frame can rotate about a central longitudinally extending shaft or tube so that as the body or vehicle moves along the ground or road, the axle structure of the vehicle will adapt itself to unevenness of the ground.

A further object of the invention is to provide a vehicle chassis or frame that is extremely simple and inexpensive to manufacture.

Other objects and advantages will be apparent during the course of the following description.

In the accompanying drawings, forming a part of this application, and in which like numerals are used to designate like parts throughout the same:

Figure 1 is a fragmentary top plan view of the chassis, and showing a portion of the vehicle body in broken lines.

Figure 2 is a fragmentary side elevational view of the chassis shown being used on a truck, portions of the truck being shown in broken lines, and portions of the chassis being shown in section.

Figure 3 is a sectional view on an enlarged scale taken on the line 3—3 of Figure 1.

Figure 4 is a sectional view taken on the line 4—4 of Figure 3.

Figure 5 is a sectional view taken on the line 5—5 of Figure 3.

Figure 6 is a sectional view taken on the line 6—6 of Figure 3.

Figure 7 is a view similar to Figure 4, but showing a modification wherein a single spring is used instead of a plurality of springs.

Figure 8 is a view similar to Figure 7 but showing another modification wherein two springs are used.

Figure 9 is a view similar to Figures 7 and 8, but showing another modification utilizing shock absorbers instead of springs.

Referring in detail to the drawings, there is shown a portion of a vehicle such as a truck, and the truck includes the usual cab 10 (broken lines Figures 1 and 2). The vehicle may also include the rear axle 11 which has wheels 12 mounted thereon, and the present invention is directed to a chassis or frame which includes a forward or front body member 14, and a rear support portion 13, the support portion 13 being pivotally or rotatably connected to the body member 14 so that twisting and cracking of the frame or chassis will be prevented.

The body member 14 provides a support for the cab 10, and the body member 14 includes a pair of beams 15 which are arranged in spaced parallel relation with respect to each other. Extending between the rear ends of the beams 15 and secured thereto or formed integral therewith is a crosspiece 16. A bar 17 is arranged forwardly of the crosspiece 16, and the bar 17 extends between the beams 15 and is secured thereto.

The numeral 18 designates a hollow open ended sleeve, and the sleeve 18 extends between the crosspiece 16 and the bar 17 and is secured thereto in any suitable manner, as for example by welding. Grease fittings 19 are provided whereby suitable grease or oil or other lubricant can be supplied to the interior of the sleeve 18, whereby lubrication will be supplied to a tube 22 that is rotatably positioned in the sleeve 18. A collar 20 is mounted on the front end of the tube 22, and the collar 20 may be secured in place by suitable securing elements such as bolt and nut assemblies 21.

Mounted on the rear projecting portion of the tube 22 is a housing 23, and the housing 23 is secured to a bracket 24 in any suitable manner, as for example by welding. The bracket 24 is secured to the rotary tube 22 as by welding, so that the housing 23, bracket 24, and tube 22 rotate in unison.

Arranged at the rear end of the housing 23 and secured thereto is a widened portion 25 which includes a pair of spaced parallel struts 26 and 27 which may be secured as by welding to the rear end of the housing 23. A pair of spaced parallel frame members 28 extend rearwardly from the struts 26 and 27 and are secured thereto, and the widened portion 25 is arranged adjacent the rear wheels 12 of the truck. A strut 29 extends between the rear ends of the frame members 28 and is secured thereto.

Extending rearwardly from the strut 29 is a pair of spaced parallel channel members 30, and the rear ends of the channel members 30 are interconnected by a strut 31. It will thus be seen that the support member 13 has a configuration that is similar to the pinched frame shown in the prior Patent No. 2,596,478, and the advantages of the widened portion 25 and narrow housing 23 and inwardly spaced channel members 30 have been set out in my prior patent.

As shown in Figures 1 and 2, the support portion 13 at the rear of the vehicle may provide a support for a plurality of load carrying sections or compartments 32, 33 and 34. However, it is to be understood that the number and size of these compartments can be varied as desired and that the present invention is primarily concerned with the frame construction and not the load carrying compartment construction.

A means is provided for stabilizing the rear support portion 13 with respect to the body member 14 so that these two sections or portions will tend to normally remain in their proper aligned positions. This stabilizing means comprises in Figures 1 through 6, a plurality of spring members 36 which may be made of heavy spring metal. The spring members 36 may be curved and end portions of the spring members 36 engage lugs 35 which are secured to the undersurface of the crosspiece 16, Figures 3 and 4 and 5. Guide plates 37 depend from the bracket 24 and are secured thereto, and the guide plates 37 maintain the springs 36 in their proper position. Thus, it will be seen that in the event that the support portion 13 rocks about a vertical axis, the spring members 36 will tend to return the support portion 13 to its proper position.

A means is provided for limiting rotary movement of the support portion 13 with respect to the front body member 14. This means comprises an arcuate slot 38 which is arranged in the bracket 24, and the slot 38 registers with a similar arcuate slot 39 in the crosspiece 16. A securing element such as a bolt and nut assembly 40 extends through these registering slots 38 and 39, Figures 4 and 5.

Referring to Figure 7 of the drawings, there is shown a modified stabilizer assembly which is adapted to be used in lieu of the springs 36. Thus, in Figure 7 there is shown a single stabilizer spring 41 which may be made of one piece of spring metal, and ends of the spring 41 may abut lugs 35 which can be secured to depending lips 45 that are secured to the crosspiece 16. The intermediate portion of the spring 41 may be secured to the bracket 24 by a suitable securing element 46.

Referring to Figure 8 of the drawings there is shown another modified stabilizer mounting wherein a pair of semi-elliptical springs 42 are provided, and the springs 42 may have their upper ends secured to the bracket 24 by securing elements 34, while the lower ends of the springs 42 may abut the lugs 35.

Referring to Figure 9 there is shown a still further modification of the stabilizer assembly wherein shock absorbers 44 are interconnected between the lugs 35 and the bracket 24. The shock absorbers 44 may be used where the work conditions are exceptionally extreme or heavy.

Arranged interiorly of the tube 22 and secured thereto is a mounting bar 47, and the mounting bar 47 serves for a purpose to be later described. A portion of the tube 22 may be cut away as at 48, and a brace 49 may be secured to the lower surfaces of the struts 26 and 27 for helping to maintain these parts in their proper spaced relation.

From the foregoing it is apparent that there has been provided a vehicle chassis or frame which includes a front section or body member 14 and a rear section 13. These sections 13 and 14 are rotatably connected together or pivotally connected together by means of the tube 22 which is rotatably positioned in the sleeve 18. Thus, in the event that the vehicle encounters uneven road surfaces or bumps as it is traveling along the road or ground, the sections 13 and 14 will pivot independently about a horizontal axis extending through the tube 22. The bracket 24 is not secured to the crosspiece 16 so that the members 16 and 24 can move independently. Thus, the load which may be cases of beverages positioned in the compartments 32, 33 and 34, can shift slightly independently of the vehicle cab 10 so that the frame will not be twisted or cracked. Also, the stabilizer spring 36 or the modified stabilizing means will tend to resist any twisting of the sections 13 and 14 independently of each other and the bolt 40 extending through the slots 38 and 39 will prevent the sections from independently moving beyond a predetermined point.

The drive shaft extends through the members 13 and 14, as shown in the drawings. The drive shaft includes a forward section 50 which is adapted to have its front end connected to the vehicle transmission, and a suitable universal joint 52 connects the rear end of the front section 50 to an inclined rear shaft section 51. The forward drive section 50 may be rotatably supported by a bearing assembly 53 which can be bolted or welded to the mounting bar 47, as shown in Figure 1. The cutout 48 in the tube 22 provides sufficient clearance to permit the angularly arranged shaft section 51 to come through the tube at the desired angle, and the member 49 is a portion of the end of the narrowed frame. Thus, the drive shaft for the differential extends through the tube 22, as shown in the drawing, and the drive shaft is a part of the vehicle chassis. The shaft section 51 extends to the rear end of the vehicle for driving the rear wheels, while the forward shaft section 50 is connected to the vehicle transmission.

I claim:

1. In a vehicle frame, a front section, and a rear section, means rotatably connecting said sections together, stabilizing means for resisting independent rotary movement of said sections, and means for preventing independent rotation of said sections beyond a predetermined point, said rear section including a widened portion and a pair of end portions arranged forwardly and rearwardly of said widened portion and spaced inwardly from said widened portion, said widened portion being arranged adjacent the rear wheels of the vehicle.

2. The apparatus as described in claim 1, wherein said stabilizing means comprises a plurality of spring members interconnected to said front and rear sections.

3. The apparatus as described in claim 1, wherein said stabilizing means comprises a pair of elliptical springs interconnected to said front and rear sections.

4. The apparatus as defined in claim 1, wherein said stabilizing means comprises shock absorbers interconnected to said front and rear sections.

5. In a vehicle frame, a body member including a pair of spaced parallel beams, a crosspiece extending transversely with respect to the rear ends of said beams, a bar arranged in spaced parallel relation with respect to said crosspiece and extending between said beams and secured thereto, a hollow open ended sleeve extending between said bar and crosspiece and secured thereto, a hollow tube extending rotatably through said sleeve, a collar mounted on the front end of said tube, a support member including a housing mounted on the rear end of said tube and secured thereto, a bracket secured to the front end of said housing and arranged contiguous to said crosspiece, a pair of struts secured to the rear of said housing, a pair of spaced parallel frame members extending rearwardly from said struts, a strut extending between the rear ends of said frame members and secured thereto, a pair of spaced parallel channel members extending rearwardly from said last named strut and secured thereto, there being arcuate registering slots in said crosspiece and bracket, a securing element extending through said slots, a pair of lugs secured to the lower surface of said crosspiece, and spring members interposed between said lugs and bracket.

6. In a vehicle frame, a body member including a pair of beams, a crosspiece extending transversely with respect to said beams, a bar extending between said beams and secured thereto, a hollow open ended sleeve extending between said bar and crosspiece and secured thereto, a hollow tube extending rotatably through said sleeve, a collar mounted on said tube, a support member including a housing mounted on said tube and secured thereto, a bracket secured to said housing and arranged contiguous to said crosspiece, a pair of struts secured to the rear of said housing, a pair of frame members extending rearwardly from said struts, a strut extending between said frame members and secured thereto, a pair of channel members extending rearwardly from said last named strut and secured thereto, there being registering slots in said crosspiece and bracket, a securing element extending through said slots, a pair of lugs secured to said crosspiece, and resilient means interposed between said lugs and brackets.

References Cited in the file of this patent

UNITED STATES PATENTS

| | | |
|---|---|---|
| 149,591 | Martin | Apr. 14, 1874 |
| 201,159 | Caton | Mar. 12, 1878 |
| 1,886,319 | Cohen | Nov. 1, 1932 |
| 2,366,166 | Willock | Jan. 2, 1945 |
| 2,596,478 | Gerhardt | May 13, 1952 |